April 4, 1939.  P. M. LINCOLN ET AL  2,153,092
THERMAL ELECTRIC METER
Filed April 9, 1937
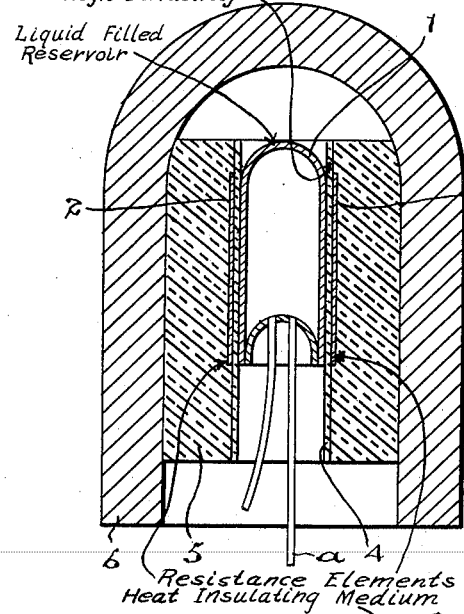
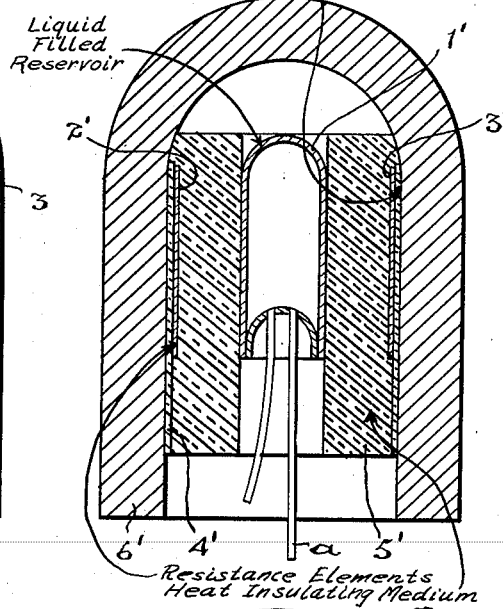
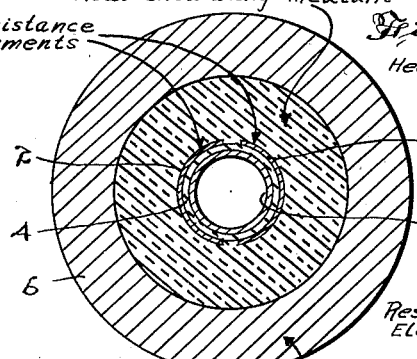
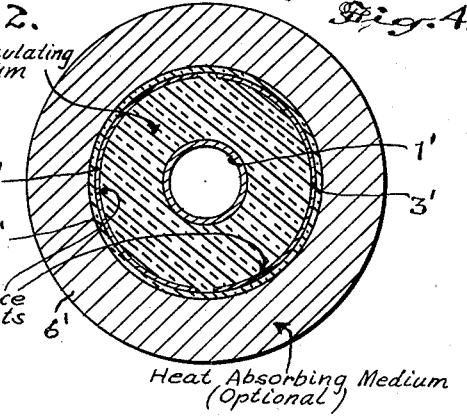
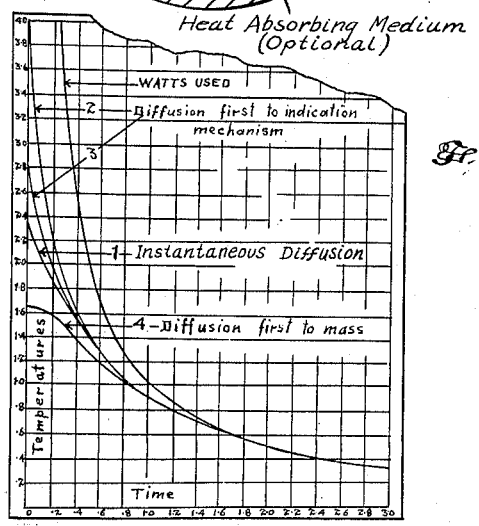
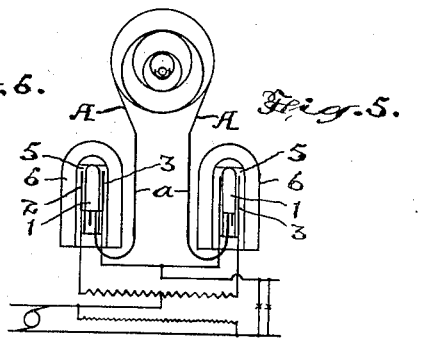
Inventors
Paul M. Lincoln,
Robert R. Sproles Patented Apr. 4, 1939

2,153,092

UNITED STATES PATENT OFFICE 2,153,092

THERMAL ELECTRIC METER

Paul M. Lincoln and Robert R. Sprole, Ithaca, N. Y.; said Sprole assignor to said Lincoln Application April 9, 1937, Serial No. 135,886

8 Claims. (Cl. 171—95)

The principal objects of this invention are to improve the effective operating qualities of demand meters so that a more equitable basis of distribution of the costs of operation of an electrical system may be obtained so as to facilitate the establishment of rates for electric service, by the provision of a means for assessing the user of an electric service an amount as nearly as possible proportional to the value of equipment and other property which must be provided in order to serve the public.

It is of course understood that the cost of electrical distribution equipment is proportional not to the total energy (kilowatt hours) used, but to the maximum rate at which the service equipment is used during any given billing period, and the principal object is to provide a means for measuring this rate. The ideal to be striven for is to provide a metering device which will closely simulate the characteristics of the apparatus from which the service is derived.

The principal feature of the invention consists in associating with registering means and heat-actuated means for operating said registering means and heaters affected by the rate of service, a means for affecting the rate of absorption of heat from the heaters by the means for actuating the registering means in advance of its absorption by the heat-absorbing means as a whole.

In the accompanying drawing, Figure 1 is a much enlarged diagrammatic sectional view of a unit to be applied in my improved demand meter.

Figure 2 is a sectional view of the structure illustrated in Figure 1.

Figure 3 is a view similar to Figure 1 illustrating the converse of the arrangement shown in Figure 1 between the heat producing and the heat absorbing means.

Figure 4 is a sectional elevational view of the structure illustrated in Figure 3.

Figure 5 is a small diagrammatic view illustrating the application of the invention to the registering means of a metering device.

Figure 6 is a curve diagram illustrating the reaction of the apparatus herein described.

It has long been recognized in the electrical industry that meters for the purpose of measuring maximum demand provide an equitable and desirable means for establishing rates for services and the thermal type demand meter has been widely recognized as being capable of producing reliable results.

The Bourdon tube type of means for actuating the registering means has been recognized as being extremely effective and is described in detail in United States Patent 1,940,759 of December 26, 1933 and a further development of the application is found in United States Patent 1,982,535 of February 26, 1935 and Reissue No. 20,172 of November 17, 1936.

The present invention is particularly applicable to the type of meter utilizing the Bourdon tube principle of operating the registering mechanism and as illustrated in the accompanying drawing, the capillary tube $a$ connected with the meter-actuating Bourdon tube A is connected with the liquid-filled reservoir 1 which, as has been described in the previous patents, is of a drawn steel construction and very readily absorbs heat. However, we do not desire to restrict ourselves to the Bourdon tube type of actuating mechanism nor to the drawn steel liquid reservoirs.

Resistance elements 2 and 3 preferably of part cylindrical form, substantially surround the liquid cylinder 1 and are preferably as closely associated with the external area of said cylinder as is physically possible while electrical insulation is maintained therebetween in the form of a cylinder 4. This insulating cylinder is composed of a material with as rapid a diffusivity as can be obtained and a thickness as low as is compatible with suitable electrical insulation.

Closely surrounding the cylinder 4 and the proximate heater element 2 is a cylindrical element 5 which is a comparatively thick mass of insulating material with preferably a slow diffusivity.

Surrounding the cylinder 5 is a heat absorbing element here shown as a heavy metal thimble 6 which is preferably closed at one end. It has been found that a variable arrangement may be adopted in accordance with the particular requirements and the thimble may be dispensed with and the mass 5 may be utilized as the heat absorbing element.

When current is caused to pass at a constant rate through the resistances 2 and 3, heat is of course generated. If this generated heat were instantly diffused throughout the masses of the cylinder 1, the enclosing cylinder 5, the insulating cylinder 4 and the outer thimble 6, the resulting temperature rise of the entire mass would follow an exponential law and if this condition occurred it could be proved mathematically that if a given amount of energy (kilowatt hours) were introduced into the heater resistances 2 and 3 in a given time, the resultant temperature rise of the mass would follow the curve 1 Figure 6, (see A. I. E. E. Journal, April 1934, pages 625–626).

It is however well known that diffusion cannot occur instantly and time is required for the heat to travel from the heaters 2 and 3 into the adjacent masses. Such time period is of course controlled by the shape of the mass, the disposition of the heaters therein and by the diffusivity of these materials, which quality is directly associated with heat conductivity, density and specific heat of the materials of the mass.

Referring to Figure 1, it is obvious that the heat produced in the resistances 2 and 3 will much more readily flow into the fluid reservoir 1 through the relatively thin rapidly diffusing insulation 4 than it will into the heat-absorbing mass of the thimble 6 through the relatively thick slowly diffusing insulation 5. Therefore, the reservoir 1 which constitutes the actuating element of the thermal meter will begin to heat more quickly than will the mass of material as a whole.

This type of construction gives rise to a responsive curve similar to the curves 2 and 3 illustrated in Figure 6. This statement has been proved mathematically and has also been proved experimentally and the curves herein shown are the results of actual experimental operation.

The diagrammatic illustrations in Figures 3 and 4 are for the purpose of illustrating the opposite relationship wherein the cylinder 1' is immediately surrounded by the thick insulating cylinder 5' of slow diffusivity and the heaters 2' and 3' arranged outside of the cylinder 5' are insulated by the thin insulation cylinder 4' from the outer heat-absorbing thimble 6'.

With a construction such as herein shown in Figures 3 and 4 with the heaters thermally close to the heat-absorbing element 6' and thermally distant from the fluid cylinder 1', the heat generated in the heaters will be rapidly absorbed by the member 6' and during the beginning of the heating period the cylinder 1' will acquire temperature more slowly than if diffusion were instantaneous.

The resulting response curve under conditions obtaining in Figures 3 and 4 is that illustrated as 4 in Figure 6. This curve is a curve produced by an actual meter under test, wherein the thermal paths for heat flow simulate those of Figures 3 and 4. From this illustration it will be apparent that by adjusting the position of the heaters in a thermal meter so that the thermal diffusivity into the actuating mechanism is more rapid than into the mass as a whole, the meter will begin responding to loads imposed thereon much more quickly than if the heater position is such that the heat transmission into the actuating mechanism is delayed by using a material of slow thermal diffusivity.

It is further obvious that maximum rapidity of beginning response will be attained if the heaters are installed actually within the member 1.

High rapidity of beginning response is desirable in a thermal meter since actual electrical machines respond in their temperature rise in this same manner. A considerable part of the heat which causes electrical machinery such as motors, generators, transformers, etc., to rise in temperature under load, is released in the windings of such machinery and such windings are insulated from the iron parts of the machine, both electrically and thermally. Hence it follows that large sudden overloads on electrical machinery will cause the winding to heat much more rapidly than does the machine as a whole. Since it is the temperature rise of electrical machinery that limits its capacity and since it is the temperature of the insulation that limits the allowable temperature rise in electrical machinery, the demand meter construction shown in Figures 1 and 2 is obviously preferable to that shown in Figures 3 and 4.

A demand meter which has a heating law of the same character as the law which affects electrical machinery must be more accurate in its interpretation of the forces expended. By proper placement of the heaters of our meter and by proper selection of the diffusivity of the materials used and by proper adjustment of the amount and position of the heat absorbing means, the action that takes place in the heating of the insulation of electrical machinery may be closely simulated.

It will be appreciated that in accordance with the present showing it is desirable to have a disposition of the heaters within the mass being heated in such a manner that the actuating mechanism is affected by the heat from the heaters in advance of the mass as a whole.

It will be appreciated that the heaters, the insulating materials and heat absorbing parts may be varied considerably in their design, proportions and arrangement without departing from the spirit of this invention.

What we claim as our invention is:

1. A thermal electric meter comprising a registering device having a heat-responsive actuating mechanism, heaters subject to the effect of electric current flow, and means for effecting rapid thermal diffusion between the heaters and the actuating mechanism including a heat-absorbing mass surrounding said heaters and actuating mechanism having very low rapidity of heat diffusivity.

2. In a thermal electric meter, the combination with a heat-actuated registering mechanism having heat-absorbing media, of heaters heated by the passage of electric current therethrough arranged in intimate thermal association with said heat-absorbing media, and means of slow thermal diffusivity surrounding said heaters and heat-absorbing media.

3. In a thermal meter having heat-responsive register-actuating media, means including an electric heater and insulating means of respectively high and low diffusivity disposed on opposite sides of said heater and embedding the same, for subjecting said heat-responsive media to an increase in temperature in advance of the remainder of the mass in which the actuating mechanism is embedded.

4. A thermal meter in which heat-responsive registering means and electrically-energized heaters are enclosed in a mass of material of low diffusivity and insulation arranged between the heaters and the heat-responsive registering means is apportioned to insure the heat-responsive means being affected in advance of the mass as a whole.

5. In a thermal meter of the Bourdon tube register type having a fluid reservoir connected with the Bourdon tube, a thin film of electrical insulating material surrounding said reservoir, spaced heaters surrounding said enveloping insulating material, a heavy mass of insulating material surrounding said heaters, and a heat-absorbing medium surrounding said insulating mass.

6. In a thermal electric meter, a registering mechanism, heat-responsive means physically connected to operate said registering mechanism, heaters arranged in close proximity to said heat-responsive means, and a film of insulating material arranged between said heaters and said heat-responsive means of sufficient thickness only to ensure electrical insulation while effecting the maximum of heat transference between said heaters and said heat-responsive means.

7. Means as claimed in claim 2 in which a heavy mass of heat-absorbing material is separated from said heaters by said means of slow thermal diffusivity.

8. Means as claimed in claim 2 in which a heavy metal thimble is supported by said means of slow thermal diffusivity in substantially uniform spaced relation to the heaters to act as a heat-absorbing body for heat units penetrating the means of slow thermal diffusivity.

PAUL M. LINCOLN.
ROBERT R. SPROLE.